Oct. 6, 1953 P. K. WEIMER 2,654,853

PHOTOELECTRIC APPARATUS

Filed Feb. 28, 1949

INVENTOR
PAUL K. WEIMER
BY Morris A. Rabin
ATTORNEY

Patented Oct. 6, 1953

2,654,853

UNITED STATES PATENT OFFICE 2,654,853

PHOTOELECTRIC APPARATUS

Paul K. Weimer, Princeton, N. J., assignor to Radio Corporation of America, a corporation of Delaware Application February 28, 1949, Serial No. 78,687

10 Claims. (Cl. 315—10)

Figures 1, 2, 3, 4, 5:
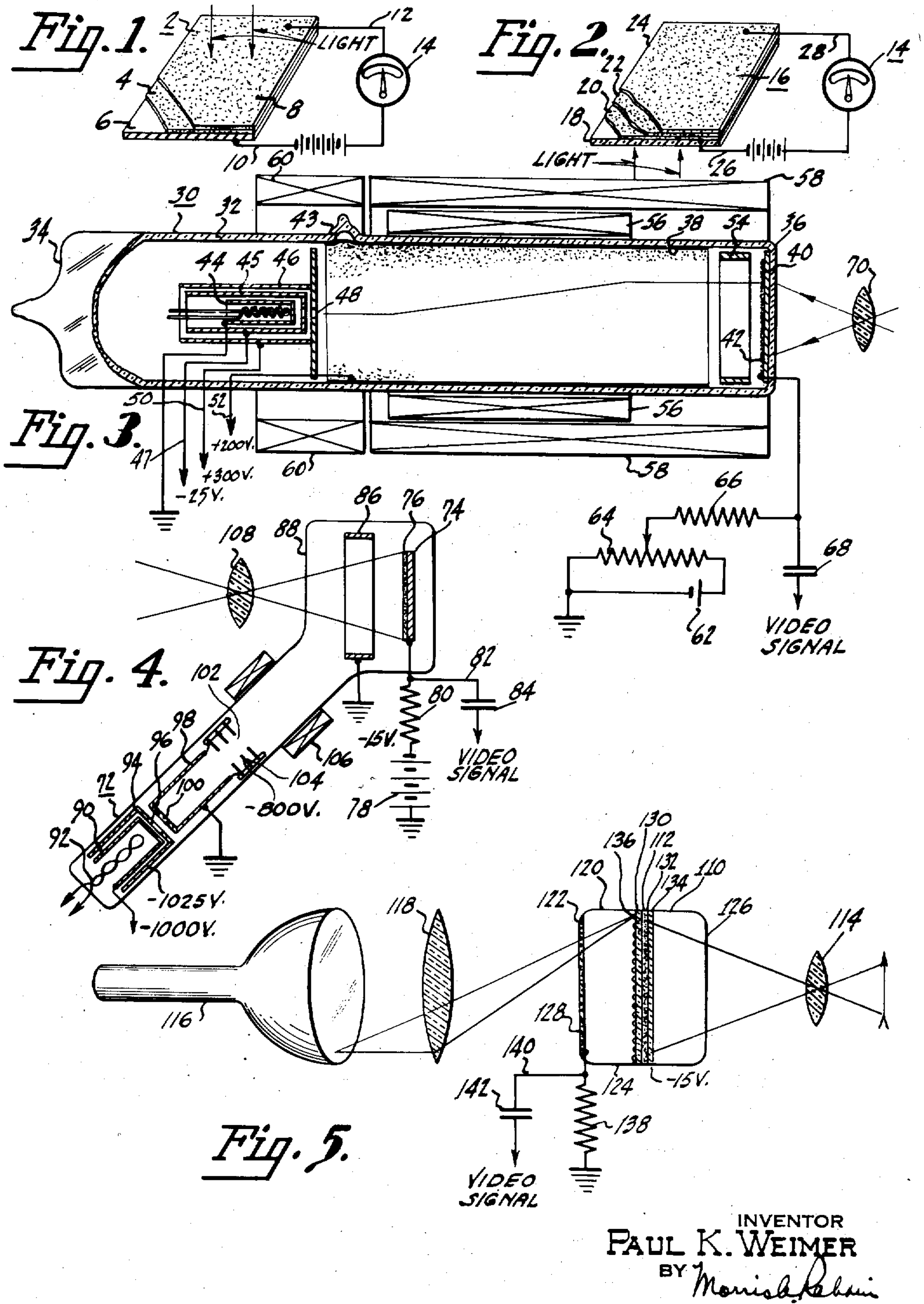

This invention relates to improvements in photoconductive material and to improved apparatus including this material.

More particularly, the invention is based on the discovery that the variety of selenium evaporated and then deposited in vacuo on a cool surface has excellent photoconductive properties, together with high dark resistivity. Improved apparatus utilizing this form of selenium, which is red in color, as the light sensitive part of a photoconductive element has been provided as a result. The results of exhaustive tests appear to agree with previously published work that the selenium thus deposited is substantially all amorphous rather than crystalline and that if any crystalline selenium is present, it is of the red monoclinic variety and is present in very small amounts.

Whenever the term "amorphous selenium" is used in the present specification, it will be understood to refer to selenium prepared as above described and will be understood not to exclude the presence of very small amounts of the crystalline forms, which are almost impossible to keep out entirely.

It has previously been known that various materials exhibit the property of lower resistance to passage of electrical current when subjected to light than when in darkness. In the case of some of these materials, however, the dark resistivity is not sufficiently high to be of practical value and, in the case of others, the sensitivity to changes in intensity of illumination is not very great.

The element, selenium, is known to exist in several different allotropic forms, two of which are crystalline, and another of which is amorphous. One of the crystalline forms has a gray, metallic appearance while the other is a red colored, monoclinic variety. The amorphous (non-crystalline) form is also red in color. Both of the crystalline forms have previously been known to be photoconductive and the gray form, especially, has been commonly used in photocells and other apparatus employing photosensitive electrodes. However, it has not been known that the amorphous variety is also photoconductive and that it has many advantageous characteristics. Greatly improved apparatus, such as television pick-up tubes, may be made, utilizing the red amorphous variety of selenium for the photosensitive target.

One object of the invention is to provide an improved light sensitive cell.

Another object of the invention is to provide an improved target electrode for television pick-up tubes.

Another object of the invention is to provide an improved television pick-up tube.

Another object of the invention is to provide a television pick-up tube having improved sensitivity.

A further object of the present invention is to provide an improved television pick-up tube having greater simplicity of construction.

Still another object of the present invention is to provide an improved television pick-up tube having greater simplicity of operation.

Previous investigators have found that amorphous selenium can be prepared from any one of the other allotropic forms by evaporating a quantity of the element in a vacuum and condensing the vapor on a cool surface. The surface must be kept at a temperature substantially below 65° C., and preferably below 50° C., since the amorphous selenium changes to the crystalline variety at temperatures of 65°–90° C.

Selenium, as thus deposited, can be used in various types of apparatus utilizing a light sensitive element of the photoconductive type, as illustrated in the following figures, of which:

Fig. 1 is a perspective view, partially cut away, of a photocell which illustrates one embodiment of the present invention, Fig. 2 is a similar view of another type of photocell, illustrating a second embodiment of the invention, Fig. 3 is an elevation view, partially in section and partially diagrammatic of a television pick-up tube employing electron optics of the orthicon type and illustrating a third embodiment of the invention, Fig. 4 is a diagrammatic view of a television pick-up tube employing electron optics of the iconoscope type, illustrating a fourth embodiment of the invention, and Fig. 5 is a diagrammatic view of a pick-up tube using flying spot scanning and illustrating a fifth embodiment of the invention.

As shown in Fig. 1, a photocell 2 may be made by depositing a layer 4 of amorphous selenium on a metal backing plate 6 and then depositing a thin, light-transmitting layer of metal 8 on the selenium layer. Lead wires 10 and 12 may be connected to the metal plate 6 and the top metallic coating 8, respectively. The selenium layer is formed, as previously indicated, by evaporating a quantity of the element in a vacuum and depositing it on the metal plate which should be maintained preferably at room temperature or lower, although it may be permitted to rise somewhat higher in temperature. The metal plate 6 and the metallic coating 8 serve as electrodes, by means of which a circuit is established through the photoconductive layer 4. A battery, or other source of direct current, may furnish energy for the circuit, which may include other components such as a current meter 14.

Both the metal plate and the metal coating of the above described embodiment may be of aluminum, although various other metals may also be used.

Another typical embodiment of an improved photocell 16, utilizing the novel photoconductive material disclosed herein, is illustrated in Fig. 2. This embodiment comprises a backing plate 18 of insulating material, such as glass or mica. On the backing plate is deposited a thin, light-transmitting layer 20 of a conductive material, which may consist of a metal such as aluminum. A layer of amorphous selenium 22 is deposited (by the method previously described) on the metal coating 20 and a second metallic layer 24 is then deposited over the selenium. Leads 26 and 28 are connected to the metal layers 20 and 24, respectively. This cell may be connected in a circuit in the same manner as photocell 2.

In the case of each of the above described embodiments, light is directed on the surface of the selenium and when the intensity of the light is varied, the conductivity of the selenium changes in direct ratio to the intensity. Thus, more light causes a higher current reading to be observed on the current meter 14 and less light causes a lower reading to be observed. In both cases, because of better sensitivity, the side of the cell being illuminated should preferably be made the positive electrode.

One of the principal advantages found in the use of amorphous selenium in a photosensitive cell, such as described above, is the fact that this form of selenium has been found to have higher dark resistivity than other forms. This results in a much lower dark current and a higher ratio between the current reading in the light and that in darkness.

Another important advantage in using amorphous selenium in a photocell is that it has less lag, in its response to changes in light intensity, than has been found for other forms of selenium.

Because of the improved properties of the amorphous selenium with respect to lower dark current, it has been found possible to construct greatly improved television pick-up tubes of the orthicon type, an embodiment of which is illustrated in Fig. 3. The dark resistivity of the amorphous selenium is sufficiently high to permit storage of charge during the frame time, thereby assuring high sensitivity. As shown in the figure, the tube 30 may comprise an evacuated glass cylinder having side wall 32, an end 34 serving as a base through which various leads enter the tube, and another end wall 36 through which the light rays enter from the scene being viewed.

The interior of the side wall 32 is provided with a conducting medium 38, which may be either a conductive coating or a metal cylinder.

The interior of the viewing end 36 is provided with a transparent signal plate 40, upon which a coating 42 of amorphous selenium is deposited. The transparent signal plate may comprise a light-transmitting coating of metal or, preferably, a transparent coating of conductive material such as stannic oxide deposited by methods well known in the art. The selenium is preferably deposited by placing a small quantity of the element in a small side arm 43, sealed to the side wall 32 and having an open passage leading to the interior of the larger cylindrical tube, and then, with the tube under vacuum, heating the small side arm and all parts of the cylindrical tube except the signal plate, to a temperature high enough to evaporate the selenium. The selenium will distill out of the side arm and most of it will deposit only on the relatively cool signal plate 40 as a thin, uniform coating. Enough selenium is used to provide a coating, preferably about 0.1 mil in thickness, but this is not critical. As in the previously described embodiments of the invention, the surface upon which the selenium is being deposited should preferably be kept at a temperature below 50° C.

The tube 30 is also provided with the necessary, well known components needed to produce a beam of electrons and to control this beam so that it may be scanned across the selenium-coated target. Within the tube, adjacent the base, are positioned a cathode source of electrons 44, a grid 45 surrounding the cathode, and a positively charged accelerating electrode 46 in the form of a metal cylinder surrounding and extending beyond the grid. The forward end of the accelerating electrode is provided with a defining aperture 48. The grid 45 is connected to a source of negative potential (not shown) through a conductor 47. The accelerating electrode 46 is connected to a source of positive potential (not shown), by means of a conductor 50. The wall coating 38 serves as a focusing electrode and it is also connected to a suitable source of positive potential (not shown) through a conductor 52. The tube is also provided with a ring electrode 54 adjacent the selenium coated signal plate. This ring electrode is a decelerating electrode and aids the focusing around the edges of the signal plate.

Means for controlling the scanning and focusing of the electron beam are provided outside the tube 30. These may comprise the usual deflection yoke coils 56 positioned along the exterior of the side wall 32 about half way between the cathode 44 and the selenium target 42, and focusing coils 58 positioned outside the yoke coils. Smaller alignment coils 60 may also be placed adjacent the tube walls for the purpose of compensating for mechanical misalignment of the electron gun or target.

The use of the improved electron beam target of the present invention permits greatly improved operation of the tube, characterized by extreme simplicity of operation and control. Either high or low velocity scanning may be used. In operation, the cathode may be operated at ground potential and the grid may be operated at −25 v. The accelerating electrode 46 surrounding the "electron gun" may be connected to a source of 300 v. positive potential, while the focusing electrode 38, extending concentric with the path of the electron beam, may be connected to a source of 200 v. positive potential. Using low velocity scanning, a small positive voltage, of say 5 to 10 volts, is applied to the signal plate 40, as from a source of potential, which comprises a battery 62 and a resistance 64. The voltage selected may be varied by moving a slider, and a load resistor 66 may be included in the circuit. The signal plate may also be directly connected to an amplifier (not shown) through a blocking capacitor 68.

With the positive voltage applied to the signal plate, the operation is as follows. The electron beam is focused on the selenium-coated signal plate and caused to scan it repeatedly, as a picture is focused on the viewing end wall 36, by means of an optical system indicated at 70. Before light is directed on the plate, the selenium target, in the dark, is an insulator and the electron beam quickly charges the scanned side down to cathode potential. When light is allowed to impinge on the target, the conductivity of the selenium is increased, thus causing the scanned surface of the target to charge gradually positive during the frame time. The scanning beam deposits electrons in proportion to the light intensity, returning the scanned surface to zero potential.

If the tube is operated, using high velocity scanning, the signal plate may be held either positive or negative with respect to the wall potential, thus generating a video signal of either polarity.

Instead of connecting the video signal amplifier directly to the signal plate, as above described, an image orthicon type of electron multiplier may be used, if desired.

The use of photoconductive, amorphous, red selenium has been found to improve greatly the operation of the orthicon type television pick-up tube partly because of its unusually high dark resistivity, which is in excess of $10^{13}$ ohm-cm. A high dark resistivity of the photosensitive material of the target electrode gives a cleaner, more uniform picture, since the spurious signals generated by the beam scanning the target in the dark will be less.

It has also been found that improved television pick-up tubes of other types can be made, using amorphous selenium as the photosensitive material upon which the scene being televised is focused.

An example of these other types of tubes is shown in Fig. 4, which illustrates a typical tube of the iconoscope type. This type of tube may include a glass envelope 72, having a conductive signal plate 74, carrying a coating 76 of amorphous selenium, deposited as previously described in connection with the orthicon type tube. The signal plate is connected to a source of negative potential 78 through a load resistor 80. The video signal is also taken from the signal plate by means of a conductor 82. The video signal lead may be connected to an amplifier (not shown) through a coupling capacitor 84.

A collector electrode 86, which may be in the form of a metal ring, is provided between the coated signal plate 74 and the viewing window 88 of the tube through which the light rays enter to impinge on the selenium surface.

Suitable elements are also provided for scanning the selenium target with a focused beam of electrons. These elements may include a source of electrons in the form of a cathode 90, which is provided with a heater 92. A grid 94 surrounds the cathode. The grid is provided with an aperture 96 through which electrons from the cathode 90 are projected toward the signal plate. Concentric with the axis of the tube is an accelerating electrode 98, having an entrance aperture 100 and an exit aperture 102. Near the exit aperture is positioned a focusing electrode 104.

In operation, the heated cathode may be maintained at a potential of about —1000 v. and the grid 94 may be maintained at about —1025 v. The accelerating electrode 98 is grounded, while the focusing electrode 104 is kept at about —800 v. The signal plate 74 may be operated at a potential of about —15 v. The stream of electrons produced by the cathode is focused adjacent the grid aperture 96 and the divergent electron rays beyond the focal point are again focused to a spot on the target electrode surface. This spot is scanned across the target surface by operation of deflection yoke coils 106 positioned around the outside of the barrel of the tube.

Light rays reflected from the scene being televised are focused on the selenium-coated surface 76 by means of an optical system as indicated at 108. Differences in the intensity of the light impinging on the selenium coating cause corresponding changes in conductivity of the selenium and when the selenium coating is scanned by the electron beam, the video signal is produced and is taken off the signal plate through the conductor 82.

Still another form of improved television pick-up tube made possible by the present invention is that utilizing the flying spot type of scanning, as illustrated in Fig. 5. As shown in the figure, a system employing flying spot scanning may include a pick-up tube 110 having a double-sided, light-sensitive screen 112, an optical system 114, for focusing light from a scene on one side of the screen 112, and a flying-spot scanner which may be in the form of a cathode ray tube 116, together with a suitable optical system 118 for focusing the light from the flying spot on the other side of the screen 112.

The pick-up tube 110 of this system may comprise an evacuated envelope 120, within which is the light sensitive screen 112 and a collecting electrode 122. The tube envelope may be made up of a cylindrical side wall 124, a transparent viewing window 126 adapted to face the scene being televised, and a transparent scanning window 128, adapted to face the flying spot scanner. The screen 112 may include a very thin plate 130 of a semi-conducting material having a resistivity of about $10^{11}$ ohms-cm. This plate should preferably be less than .1 micron in thickness. The side of this plate facing the viewing window of the tube is provided with a coating of amorphous selenium 132, which may also be about 1 micron in thickness. The selenium coating is then covered with a light-transparent film of metal 134 which is connected to a source of low negative potential, preferably of the order of 15 volts.

The other side of the semi-conductor plate 130, facing the flying spot scanner, is provided with a mosaic 136 of a photo-emitting substance. This may be silver oxide and caesium.

The collecting electrode 122 is preferably in the form of a coating of conductive material on the interior of the scanning window 128 facing the flying spot scanner. The conductive coating may be stannic oxide or a metal. This collecting electrode is connected to ground through a load resistor 138 and is provided with a lead 140 through which the video signal is conducted to an amplifier (not shown) through a coupling capacitor 142.

With no light entering from a scene, the dark resistivity of the selenium is high enough to prevent flow of current through the photoconductive electrode. Consequently, there will be no current flow in the collecting electrode 122.

When light strikes the selenium coating, the selenium conducts and is charged negatively from the source of negative potential connected to the metal film 134. Current conducted through the semi-conductor 130 charges the photoemitting surface 136 negatively. The flying spot, striking the negatively charged photo-emitter causes electrons to be emitted and to travel to the collecting electrode 122. Emission of electrons from the photo-emitter would soon leave it charged to a degree preventing further emission, but more light striking the selenium coating causes more negative current to flow and brings the photo-emitter back to a negative potential.

Variations in the current appearing on the collecting electrode 122 result in the production of a video signal.

In any of the above described modifications, where a conductive signal plate electrode, in contact with a selenium coating, is required, any metal or conductive substance may be used which does not react unfavorably with the selenium. Among the metals found to produce especially good results are gold, platinum, aluminum, beryllium, sputtered palladium and silver. The use of one of these metals, compared with the use of a conductive metal, such as stannic oxide, offers the advantage of varying the spectral response characteristics of the cell. The combination of selenium and stannic oxide produces a cell having considerably better response in the blue end of the spectrum than in the red end. But when certain of the metals are used as signal plate electrodes, response to light in the red wavelengths is improved without decreasing response in the blue wavelengths. The response varies with the metal used.

I claim as my invention:

1. A light sensitive cell comprising a layer of selenium which is substantially completely of the red, amorphous variety, and two electrodes in contact with said layer.

2. A light sensitive cell comprising a layer of selenium which is substantially completely of the red, amorphous variety, a source of current, and means for connecting said layer of selenium in circuit with said source of current.

3. A cell according to claim 2 in which said source of current comprises means for generating a beam of electrons.

4. A target electrode for a television pick-up tube comprising a conductive signal plate and a layer of red, amorphous selenium, said selenium layer being in intimate surface contact with said plate.

5. A television pick-up system including means for generating a beam of energy, a target electrode, means for scanning a surface of said target electrode with said beam, said target electrode including a conductive signal plate and, in intimate surface contact with said signal plate, a layer of red, amorphous selenium.

6. A television pick-up tube including an evacuated envelope, means for generating an electron beam, a target electrode, means for scanning a surface of said electrode with said beam, said target electrode comprising a conductive signal plate and, in intimate surface contact with said signal plate, a layer of red, amorphous selenium.

7. A television pickup tube comprising, means including an electron gun for forming an electron beam along a path, a target electrode mounted transversely to said beam path, said target electrode including a support plate member, a film of conductive material on the surface of said support plate facing said electron gun, and a thin film of red amorphous selenium deposited over the surface of said conductive film.

8. An electron discharge device for producing electrical signals comprising, means including an electron gun for forming and directing an electron beam along a path, said electron gun means including a source of electrons and a plurality of electrodes, a target electrode including a transparent support plate member mounted transversely to said beam path, a thin light-transmissive conductive film on the surface of said support plate facing said electron gun, a film of red amorphous selenium formed on the surface of said conductive film, and lead means for connecting to said conductive film and said gun electrodes for joining them to sources of operating potential.

9. An electron discharge device for producing electrical signals comprising, a transparent support member, a thin conductive light transmitting film on a surface of said support member, a film of red amorphous selenium on the exposed surface of said conductive film, means for charging the surface of said selenium film in varying amounts to form a charge pattern thereon corresponding to an optical image, and means including a scanning device for discharging the selenium surface.

10. A signal generating device including a target electrode comprising a thin sheet of semiconducting glass, a thin film of red amorphous selenium on one surface of said glass sheet, a light-transmitting conductive film on the exposed surface of said red amorphous selenium film, a photoemissive mosaic film on the opposite surface of said glass sheet, and means including a scanning device for causing an electron discharge from said mosaic film.

PAUL K. WEIMER.

References Cited in the file of this patent

UNITED STATES PATENTS

| Number | Name | Date |
|---|---|---|
| 1,456,532 | Brown | May 29, 1923 |
| 1,807,056 | Zworykin | May 26, 1931 |
| 2,013,162 | McCreary | Sept. 3, 1935 |
| 2,150,980 | Lubszynski | Mar. 21, 1939 |

OTHER REFERENCES

Article by Nicholson in Physical Review, vol. III, No. 1, January 1914, pp. 1–5. (Copy in Div. 67.)

Comprehensive Treatise of Inorganic and Theoretical Chemistry by Mellor, vol. 10, p. 701. (Copy in Div. 59.)